INVENTORS:
JERRY M. BARRINGER,
ELLIOTT M. GILBERT

BY J. David Blumenfeld
THEIR ATTORNEY.

United States Patent Office 3,217,174
Patented Nov. 9, 1965

3,217,174
TRIGGERING CIRCUIT FOR PARALLEL SILICON CONTROLLED RECTIFIER INVERTER CIRCUIT
Jerry M. Barringer and Elliott M. Gilbert, Lynchburg, Va., assignors to General Electric Company, a corporation of New York
Filed Jan. 2, 1962, Ser. No. 163,448
3 Claims. (Cl. 307—88.5)

This invention relates to a solid state D.C. to A.C. inverter and more particularly, to a novel triggering circuit for such an inverter.

One type of solid state D.C. to A.C. inverter contemplates utilizing silicon controlled rectifiers for converting a unidirectional supply voltage to the alternating square wave output. The inverter includes a pair of silicon controlled rectifiers which are alternately triggered into conduction to invert the D.C. to A.C. Conduction of the individual silicon controlled rectifiers is initiated by applying a short positive pulse to the gate electrode of the rectifier. The individual controlled rectifiers are of the self-commutating or "quenching" type so that each rectifier is returned to the nonconducting state a fixed time after being triggered into conduction. The magnitude of the inverter output is a function of the conducting to nonconducting time ratio of the individual rectifiers. One such parallel inverter power supply is described and claimed in a concurrently filed application entitled "Regulated Power Supply" (35–73D–139), Serial No. 163,449, filed January 2, 1962, in the name of Elliott M. Gilbert and assigned to the assignee of the present invention. The self-commutating or "quenching" type of silicon controlled rectifiers described and referred to in the above copending application is also described in the General Electric Controlled Rectifier Manual, first edition, 1960, pages 119–126. These circuits are commonly known as "Morgan Circuits," after their inventor, and are also described and claimed in patent application, Serial No. 833,292, now Patent No. 3,019,355, issued January 30, 1962, entitled "Magnetic Silicon Controlled Rectifier and Power Amplifier," filed August 12, 1959, in the name of Raymond E. Morgan and assigned also to the General Electric Company, assignee of the present invention. These circuits, briefly speaking, include a saturable reactance device and a capacitor, connected in series, to act as a "quenching" circuit. This series "quenching" circuit is connected in shunt with the anode-cathode path of the silicon controlled rectifier, and the saturable reactance device acts as a switch for applying a "quenching" potential to the controlled rectifier a fixed period of time after conduction starts. For further details, as to the construction and manner of operation of such devices, reference is hereby made to the General Electric publication and the Morgan patent referred to above.

Silicon controlled rectifiers are PNPN semiconductor devices consisting of three rectifying junctions and includes anode, cathode and gate electrodes. With reverse voltage impressed across the cathode-anode electrodes (i.e., the cathode is positive relative to the anode), the controlled rectifier blocks the flow of current. When a forward bias is applied (i.e., the anode is positive relative to the cathode) the controlled rectifier also blocks the flow of current up to a "break-over" voltage which is generally referred to as $V_{BO}$. At this "break-over" voltage, the blocking resistance of the silicon controlled rectifier, usually abbreviated to the initials SCR, decreases almost instantaneously to a very low value and current flow is then limited only to external voltage and circuit impedance. At anode-cathode voltages of less than $V_{BO}$, the controlled rectifier can also be switched into the high conduction state by the application of a low level gate-cathode current. The SCR can therefore be considered as a solid state analog of a gaseous thyratron device.

As is the case with thyratron devices, the gate electrode of an SCR loses control of conduction of the device once conduction is initiated. The controlled rectifier can be "turned off" terminating the flow of current by reducing the anode current to a value less than a "holding" value, generally referred to as $I_H$. This latter can be accomplished by reducing the supply voltage to zero, as would be the case if an alternating (A.C.) supply voltage were present across the anode-cathode, by diverting the anode current around the controlled rectifier for a few microseconds required for the device to recover its blocking state, or by reversing the polarity of the supply voltage current present across the anode-cathode circuit.

In inverter circuits of this type, i.e., those utilizing a pair of alternately conducting silicon controlled rectifiers, accidental triggering of one controlled rectifier during the conduction period of the other rectifier is always a problem. That is, in normal operation triggering pulses are applied alternately to the controlled rectifiers so that only one of the rectifiers is conducting at a time. As the ambient temperature increases, however, the amplitude of the triggering signal necessary to fire the rectifier decreases. The chance of inadvertently firing one rectifier during the conduction period of the other rectifier therefore also increases, since any small transients in the circuit or extraneous noise pulses may be of sufficient amplitude to fire the nonconducting controlled rectifier. At elevated temperatures, in the order of 50° or 60° C., the problem becomes quite severe as the positive voltage necessary to fire the rectifiers is only .2–.3 of a volt and almost any extraneous noise voltages or other circuit transients may be sufficient to fire the nonconducting rectifier so that both of the silicon controlled rectifiers are conducting simultaneously. It is therefore highly desirable to provide triggering circuitry which positively inhibits one rectifier during the operative period of the remaining rectifier.

It is, therefore, one of the objects of this invention to provide an inverter circuit utilizing silicon controlled rectifiers in which misfiring of the controlled rectifiers is positively prevented;

Another object of this invention is to provide an improved inverter circuit utilizing silicon controlled rectifiers in which one of the rectifiers is reversed biased during the time the remaining rectifier is conducting;

Yet another object of this invention is to provide a novel and improved triggering circuit for an inverter circuit utilizing controlled rectifiers which positively reverse biases one of the rectifiers during the operative period of the remaining rectifier;

Further objects and advantages of the instant invention will become apparent as the description thereof proceeds.

In one form of the invention a parallel inverter circuit is provided which includes a pair of silicon controlled rectifiers which are alternately triggered into conduction by the application of suitable pulse signals. The signal is generated by a square wave oscillator the output of which is differentiated and the resulting pulses utilized to trigger the rectifiers into the conducting state. The square wave signals are not only differentiated to provide the triggering pulses for the individual controlled rectifiers but are simultaneously utilized to provide a reverse biasing voltage for the other rectifier. Thus, one controlled rectifier is positively inhibited during the operative period of the remaining one by the application of a reverse bias.

Other objects, features and many of the attendant advantages of this invention will be appreciated more readily by reference to the following detailed description taken in connection with the accompanying drawings wherein.

Figure 1:
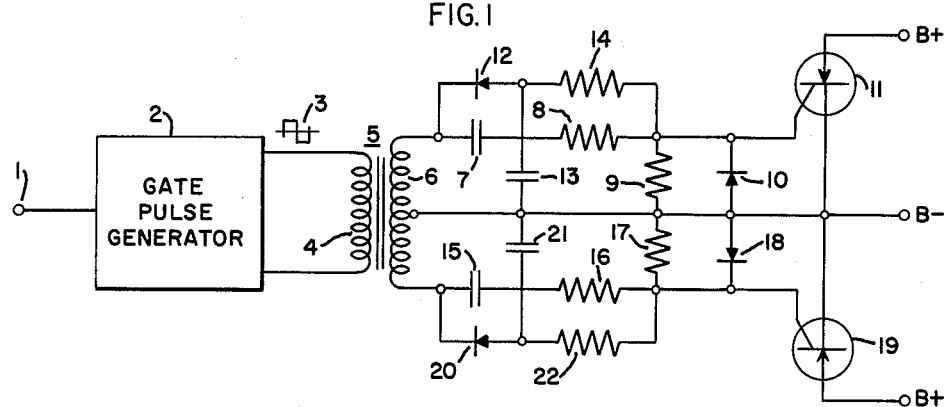
FIG. 1 is a schematic circuit diagram of a novel triggering circuit for a pair of silicon controlled rectifiers.

FIG. 1 illustrates one portion of a solid state D.C. to A.C. inverter utilizing a pair of alternately conducting silicon controlled rectifiers. The unidirectional (D.C.) supply voltage to be inverted by the inverter is impressed from a suitable source, not shown, on an input terminal 1. The D.C. supply voltage from the source, not shown, is also impressed on terminals B+ and B— connected to anode and cathode electrodes of a pair of silicon controlled rectifiers presently to be described. The supply voltage at terminal 1 energizes a gate pulse generator 2 which produces square wave output pulses 3 which are utilized to control the operative periods of the individual silicon controlled rectifiers. The period of one alternation of pulses 3 establishes the operative period of each rectifier. Each rectifier conducts for a fixed period of time which is less than the pulse alternation. For the sake of simplicity, therefore, this period will be referred to as the "gating" period since the rectifier can be triggered into and remain conducting during this interval. Gate pulse generator 2 is preferably a transistor square wave oscillator which includes a pair of transistors and a saturable reactor. The transistors function essentially as switching elements with their switching time controlled by the saturable reactor. Square wave gate pulse generators of this type are old and well known in the art and reference is hereby made to Patent No. 2,783,384, Bright et al., issued February 26, 1957, for a detailed showing and description of an oscillator of this type.

The square wave output pulses from gate pulse generator 2 are applied to the primary winding 4 of output transformer 5. The secondary winding 6 of output transformer 5 is center tapped and the opposite terminals thereof are respectively connected through suitable differentiating circuitry, presently to be described, to the gate electrodes of silicon controlled rectifiers 11 and 19. The silicon controlled rectifiers 11 and 19 have their anodes and cathodes connected to suitable terminals B— and B+ of the unidirectional supply voltage. Connected to the upper winding 6 is a differentiating circuit consisting of capacitor 6 and a current limiting resistor 8 connected in series between the winding and the gate electrode of rectifier 11. A differentiating shunt resistance 9 is also connected between the junction of the gate and resistor 8 and the common reference line connected to winding 6. Capacitor 7 and resistor 9 form a differentiating circuit which produces a short differentiated pulse from the leading edge of square wave 3 for triggering controlled rectifier 11 into conduction. Resistor 8 connected between capacitor 7 and resistor 9 limits the gate current flowing to controlled rectifier 11.

Similarly, a differentiating circuit is provided for controlled rectifier 19 which consists of capacitor 15 and current limiting resistance 16 connected in series between the lower end of winding 6 and the gate electrode and a differentiating resistor 17 connected between the junction of gate electrode and resistance 16 and the common line. Connected in shunt with the differentiating resistances 9 and 17 are a pair of reverse bias limiting diodes 10 and 18 the purpose of which will become apparent later.

During one alternation of the square wave gating voltage 3, the upper end of control winding 6 is positive and the lower end negative. Because winding 6 is center tapped and connected to a common line, a positive going square wave pulse appears across the upper half of winding 6 and a negative going pulse across the lower half of winding 6. The positive pulse is differentiated by the differentiating circuit comprising capacitor 7 and resistances 8 and 9 to produce a short positive going triggering pulse across resistance 9 which pulse is coupled to the gate electrode of the silicon controlled rectifier 11 causing it to become conducting. Simultaneously, the negative going square wave across the lower half of winding 6 is also differentiated by the differentiating circuit consisting of capacitor 15 and resistances 16 and 17. However, the pulse appearing across resistance 17 is negative going and hence does not trigger rectifier 19 into conduction. The controlled rectifier 11 therefore draws current for a fixed period of time at the end of which it is turned to the blocking state by the commutating circuit, not shown, of the type illustrated in the above mentioned patent application.

In order to maintain reverse biasing on the gate cathode path of the controlled rectifiers during the entire gating interval of the remaining controlled rectifier, and particularly during that portion of the period that it is conducting, a circuit is provided for each of the controlled rectifiers for deriving a negative gate bias from the square wave gating voltage during the gating period of the other rectifier. Thus, associated with controlled rectifier 11 and its differentiating circuit is a negative gate bias deriving circuit comprising diode 12 connected to the upper terminal of secondary winding 6, a current limiting resistor 14 connected in series with diode 12, and to the junction of resistances 8 and 9, and a shunting capacitor 13 connected between the junction of diode 12 and resistor 14 and the common conductor connected to the center tap of winding 6. Similarly, controlled rectifier 19 and its associated differentiating circuit includes a negative gate bias deriving circuit consisting of the diode 20 connected to the lower end of transformer secondary winding 6, a current limiting resistance 22 connected in series with diode 20 and to the junction of resistors 16 and 17 and a shunt capacitor 21 connected between the junction of diode and resistance 22 and the common line. Diodes 12 and 20 are so poled that they become conducting to charge their associated capacitors 13 and 21 whenever the other of the controlled rectifiers is conducting thereby preventing inadvertent firing of a rectifier during the conduction period of the other one by small extraneous noise or other transient pulses.

In operation, the novel firing and reverse biasing circuit illustrated in FIG. 1 functions in the following manner: During one square wave alternation the upper end of winding is positive with respect to the center tapped reference point and the lower end of winding 6 is negative. The positive square wave is differentiated by capacitor 7 and resistances 8 and 9 to produce a short positive going triggering pulse which is applied across the gate cathode of controlled rectifier 11 to initiate conduction. Since the lower end of winding 6 is negative with respect to the reference point, the differentiating circuit for controlled rectifier 19 consisting of capaictor 15 and resistances 16 and 17 produce a short negative going pulse. This negative triggered pulse is, of course, of the wrong polarity to initiate conduction in the controlled rectifier 19 and this rectifier remains in the nonconducting condition. However, since the lower end of winding 6 is negative with respect to the reference point represented by the common line connected to the center tap of winding 6, diode 20 conducts since its cathode is connected to the lower end of winding 6 whereas the anode is connected through resistances 22 and 17 to the common lead, i.e., a more positive point than the cathode. Hence, capacitor 21 charges up to the polarity shown with the lower plate thereof negative with respect to the upper plate. The voltage across capacitor 21 represents a reverse biasing voltage for the gate-cathode path of controlled rectifier 19 thus positively maintaining it in the reverse biased condition during the entire alternation of pulse 3, preventing any incidental extraneous noise or other pulses from inadvertently triggering this controlled rectifier.

The amount of reverse biasing applied to the gate-cathode path, as represented by the voltage to which biasing capacitor 21 charges, is controlled by the diode 18. As may be seen by inspection, diode 18 is so poled as to become conductive whenever diode 20 conducts and capacitor 21 charges up with the polarity shown. Hence, diode 18 becomes conducting and limits the reverse biasing for the gate-cathode path to the voltage drop across this diode, a voltage in the order of .8–.9 of a volt. Diode 18 thus prevents capacitor 21 from charging up too high a value of voltage, i.e., the voltage across the lower half of winding 6 so that the reverse biasing capacitor 21 may be rapidly discharged during the other alternation of the square wave input when controlled rectifier 19 is to become conducting. It will also be apparent that diode 20 continues to conduct and the charge on capacitor 21 is maintained during the entire period of the square wave alternation of the one polarity to make absolutely certain that controlled rectifier 19 remains in the blocked condition. Similarly, it may be seen that during the alternation of the first polarity, diode 12 associated with the differentiating controlling rectifier 11 is inoperative since the upper terminal of winding 6 is opsitive and diode 12 is poled in such a direction as to be nonconductive during this condition.

A fixed period of time after controlled rectifier 11 has been triggered into its conducting condition, a period which is less than the period of the alternation of the square wave gating voltage, controlled rectifier 11 ceases to conduct, a period of time which is determined by the self-commutating circuit, not shown, associated with the controlled rectifier. The reverse biasing circuit associated with rectifier 19 remains operative, however, to apply reverse biasing during the entire gate pulse alternation. During the next alternation of the square wave pulse, an alternation of the opposite polarity, the action is reversed and controlled rectifier 19 is triggered into conduction and rectifier 11 positively inhibited. The lower end of secondary winding 6 is now positive and the upper end negative with respect to the common reference point represented by the line connected to the center tap of winding 6. As a result, the differentiating circuit comprising capacitor 15 and resistances 16 and 17 associated with controlled rectifier 19 produces a short positive triggering pulse which is applied to the gate-cathode path of the rectifier causing it to become conducting. The differentiated pulse appearing across differentiating resistor 9 is a short negative pulse since upper end of winding 6 is now negative with respect to the common point, and of the wrong polarity to trigger controlled rectifier 11 into conduction. Diode 12 now becomes conducting and charges capacitor 13 to a voltage of the polarity shown which voltage is applied to the gate-cathode path of rectifier 11 through the voltage divider represented by the series connected resistances 14 and 9. This negative voltage reverse biases controlled rectifier 11 during the entire alternation of the square wave. It may be seen therefore that accidental triggering of controlled rectifier 11 by the presence of extraneous noise or other pulses in the circuit is virtually eliminated. Diode 10 connected in parallel with resistance 9 and across the gate-cathode path of rectifier 11 again limits the magnitude of the reverse biasing voltage on the gate to the voltage drop across the diode in its conducting condition, and is essentially useful in providing a quick discharge of biasing capacitor 13 at the beginning during the next half cycle at which time controlled rectifier 11 is again triggered into operation.

Figure 2:
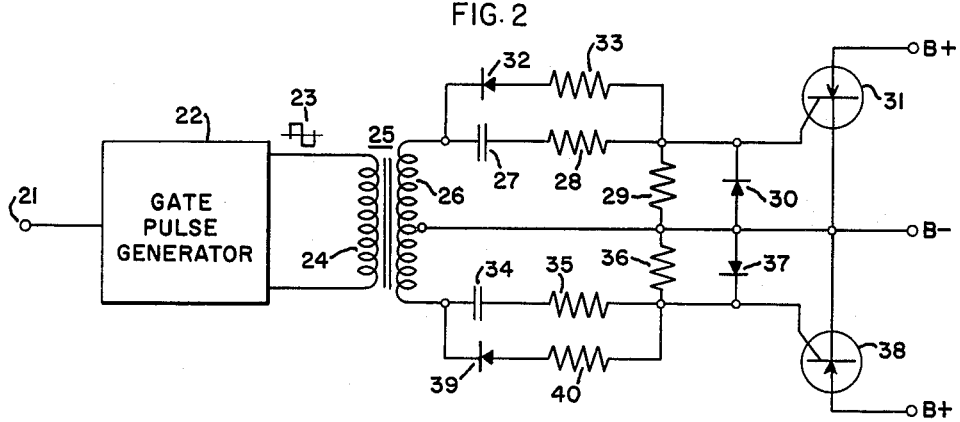
FIG. 2 is a schematic circuit diagram of an alternative embodiment of the invention.

FIG. 2 illustrates an alternative embodiment of the controlled rectifier parallel inverter in which the reverse biasing for the inverters is provided by means of a conductive path which establishes a voltage drop across the resistive element of the differentiating circuits to maintain the individual controlled rectifiers in a reverse biased condition.

A unidirectional input voltage which is to be inverted by the parallel controlled rectifier inverter is applied to an input terminal 21 and also to the anodes and cathodes of the individual controleld rectifiers. The unidirectional supply voltage is utilized to provide operating voltage for a gate pulse generator 22 which produces square wave alternating gating pulses 23 which are applied to primary winding 24 of an output transformer 25. Secondary winding 26 of transformer 25 is center tapped and the upper and lower ends are individually connected through differentiating circuits, presently to be described, to the gate electrodes of a pair of alternately conducting silicon controlled rectifiers 31 and 38. Connected to the upper winding 26 is a differentiating circuit consisting of a capacitor 27 and a current limiting resistance 28 connected in series between the winding and the gate electrode of controlled rectifier 31, and a shunt resistor 29 connected between the junction of resistance 28 and the gate electrode and the common reference point. A shunting diode 30 is connected in parallel with resistance 29 to limit the amount of reverse bias applied to the gate-cathode path.

A differentiating circuit consisting of a capacitor 34 and a current limiting resistance 35 is connected in series between the lower end of winding 26 and the gate electrode of the alternate controlled rectifier 38. A differentiating resistance 36 is connected between the junction of resistance 35 and the gate electrode in the point of common reference connected to the center tap of winding 26. A shunting diode 37 is connected in parallel with resistor 36 and the gate-cathode path of the rectifier and, as pointed out previously, functions to limit the reverse bias applied across the gate-cathode path.

Each of the differentiating circuits includes a shunt conductive path which is operative during one alternation of the square wave gating voltage, to establish the reverse biasing voltage across the gate-cathode path. Thus, a diode 32 is connected in series with a resistance 33 between the upper end of winding 26 and the junction of resistance 28 and the gate electrode of rectifier 31. The series combination of diode 32, resistance 33 therefore shunts the differentiating capacitor 27 and current limiting resistance 28 and is connected in series with differentiating resistance 29. Similarly, a diode 39 and a resistance 40 are connected in series to shunt differentiating capacitor 34 and current limiting resistance 35 of the differentiating circuit associated with controlled rectifier 38. It may be seen that these individual diodes 32 and 39 are so poled as to become conductive and establish current flow through the selected differentiating resistance during that alternation of the gate voltage when the opposite controlled rectifier is conducting. For example, during that alternation of the gate voltage when the upper end of winding 26 is positive and the lower one is negative, so that controlled rectifier 31 is caused to become conducting by the differentiated pulse, diode 32 is reverse biased and is hence not conducting, and no current flows through diode 32 to resistances 33 and 29. Diode 39, on the other hand, is now biased in its forward direction of conduction and current flows through resistance 36, resistance 40 and diode 39 to establish a voltage drop across resistance 36 which reverse biases the gate-cathode path of controlled rectifier 38 to maintain it in the nonconducting condition. This reverse biasing voltage is present during the entire gate pulse to positively inhibit controlled rectifier 38 and maintain it in the nonconducting condition.

During the square wave alternation of the opposite polarity, the upper end of winding 26 becomes negative and the lower end positive. As a result, controlled rectifier 38 is triggered into conduction by the differentiated positive pulse while simultaneously conduction of diode 39 is terminated since its cathode is now more positive than its anode. Diode 32, on the other hand, now becomes conducting since the cathode-electrode connected to the upper terminal of winding 26 is now more negative than its associated cathode and current flow is initiated through diode 32, resistor 33 and resistor 29 to establish a reverse biasing voltage across the gate-cathode path of controlled rectifier 31. This current flow continues during the entire half-cycle of the square wave gate pulse alternation and controlled rectifier 31 is thus maintained in the blocked or nonconducting condition during the entire period. It may be seen, therefore, that the individual controlled rectifiers of the parallel inverter circuit are continually controlled to prevent the inadvertent triggering of one of the controlled rectifiers during the period that the remaining one is conducting. Hence, the parallel inverter circuit shown is not subject to accidental and inadvertent triggering by extraneous noise or other pulses which may be present in the circuit.

While particular embodiments of this invention have been shown, it will, of course, be understood that it is not limited thereto since many modifications both in the circuit arrangement and in the instrumentalities employed may be made. It is contemplated by the appended claims to cover any such modifications as fall within the true spirit and scope of this invention.

What is claimed as new and desired to be secured by Letters Patent is:

1. In a triggering circuit for a pair of alternately conducting controlled rectifiers, the combination comprising having anode, cathode and gate elements,
    (a) a gate pulse generator for producing gating pulses of a given duration and for establishing a gating period for said controlled rectifiers,
    (b) individual differentiating circuit means coupled between said gate pulse generator and each of said controlled rectifiers for producing narrow triggering pulses of a duration less than the gating pulses from the gating pulse edges, triggering pulses from the individual differentiating means being alternately of a polarity suitable for alternately triggering the controlled rectifiers into conduction,
    (c) individual inhibiting circuit means including a unidirectional conducting means coupled between said gate pulse generator and the gate element of each of said controlled rectifiers for alternately producing a reverse gate biasing voltage for each controlled rectifier during the entire gate pulse interval of the associated controlled rectifier.

2. In a triggering circuit for a pair of alternately conducting silicon controlled rectifiers, each including an anode, cathode and gating electrode, the combination comprising,
    (a) a gate pulse generator for producing square wave gating pulses having alternations of opposite polarity,
    (b) means coupled to said pulse generator for converting said gating pulses into two out-of-phase gating pulse signals,
    (c) differentiating circuit means coupled to the gate electrode of each of said silicon controlled rectifiers and responsive to one of said gating pulse signals to produce narrow triggering pulses from the positive going leading edges of said pulse signals whereby one silicon controlled rectifier is triggered into conduction during positive alternation of the first of said out-of-phase gating pulse signals, and the remaining silicon control rectifier is triggered during positive alternation of the other of said out-of-phase gating pulse signals,
    (d) inhibiting circuit means coupled between said converting means and the gate electrode of each of the silicon controlled rectifiers to produce a biasing voltage from the negative alternation of said gating pulse signals to positively inhibit each silicon controlled rectifier during the interval that the associated rectifier is conducting, thereby avoiding inadvertent simultaneous triggering of both silicon controlled rectifiers, said inhibiting means including unidirectional conducting means so poled as to conduct only during the negative alternations of the gating pulse signal.

3. In a trigger circuit for a pair of alternately conducting controlled rectifiers, each of which includes an anode, cathode and gating electrode, the combination comprising:
    (a) a gate pulse generator for producing gating pulses having alternations of opposite polarity and of a given duration and for establishing a gating period for said controlled rectifiers;
    (b) individual differentiating circuit means coupled between said pulse generator and each of said rectifiers for producing narrow triggering pulses in response to the gating pulse edges, said triggering pulses having a duration less than the gating pulses, and said triggering pulses from the individual differentiating means also being alternately of a polarity suitable for triggering the controlled rectifiers into conduction;
    (c) individual inhibiting circuit means including unidirectional conducting means coupled between said pulse generator and the gating electrode of each of said controlled rectifiers for producing a reverse-biasing voltage for each rectifier in response to the negative alternations of the gating pulses for the entire gate pulse interval of the associated controlled rectifier.

References Cited by the Examiner

UNITED STATES PATENTS

| | | | |
|---|---|---|---|
| 2,535,147 | 12/50 | Markusen | 328—210 |
| 3,030,550 | 4/62 | Smeltzer | 307—88.5 |
| 3,058,011 | 10/62 | Dutton | 307—88.5 |
| 3,075,136 | 1/63 | Jones | 307—88.5 |
| 3,082,369 | 3/63 | Landis | 307—88.5 |
| 3,088,075 | 4/63 | Pintell | 307—88.5 |
| 3,127,553 | 3/64 | Grabau | 321—39 |

JOHN W. HUCKERT, *Primary Examiner.*